UNITED STATES PATENT OFFICE.

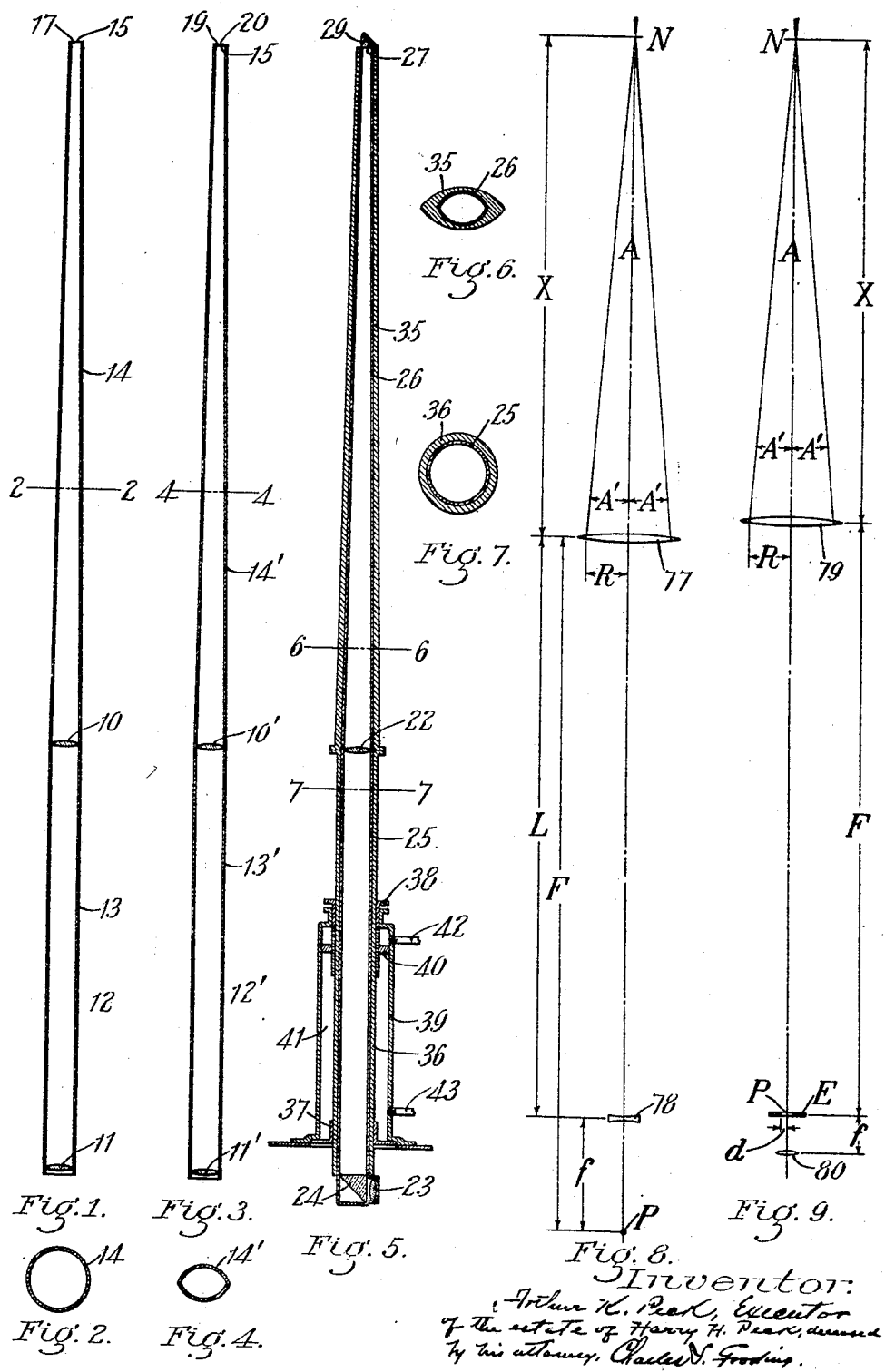

HARRY H. PECK, OF CAMBRIDGE, MASSACHUSETTS, ASSIGNOR, BY DIRECT AND MESNE ASSIGNMENTS, OF ONE-HALF TO FORE RIVER SHIPBUILDING CORPORATION, OF QUINCY, MASSACHUSETTS, THREE-EIGHTHS TO ARTHUR K. PECK, OF BOSTON, MASSACHUSETTS, AND ONE-EIGHTH TO NEWELL A. THOMPSON, JR., OF SHANGHAI, CHINA.

OPTICAL INSTRUMENT.

1,304,507. Specification of Letters Patent. Patented May 20, 1919.

Application filed October 23, 1916. Serial No. 127,084.

*To all whom it may concern:*

Be it known that I, HARRY H. PECK, a citizen of the United States, residing at Cambridge, in the county of Middlesex and State of Massachusetts, have invented new and useful Improvements in Optical Instruments, of which the following is a specification.

This invention relates to optical instruments, the object of the invention being to provide an optical instrument, the objective end of which is comparatively of very small diameter.

The invention is particularly adapted to be used in connection with periscopes such as are used on submarines, but while the invention hereinafter described is particularly illustrated and described in connection with periscopes, I wish it to be distinctly understood that I do not limit my invention to periscopes, the same being applicable to other forms of optical instruments. In periscopes it is understood that the portion of the periscope which extends above the water should be of as small diameter as possible in order that it may not be visible to the enemy.

The object of the invention is to obtain a clear view of a distant object through a very small and slender tube or housing.

The object of the invention is further to provide a periscope which is small in diameter where it projects above the water and for a considerable distance below the water so that the same may be difficult of observation by the enemy, and also so that it may not make a perceptible wake in the water, for it is by the wake as well as by the part of the periscope extending above the surface of the water that the submarine is discovered by the enemy.

The invention primarily consists in a telescope objective and an eye-piece with a housing therefor extending beyond the telescope objective, preferably in the form of a cone, to the nodal point of said objective, said housing forming a means for snugly inclosing the rays of light from the object viewed.

The invention consists in an optical instrument such as hereinafter set forth in the specification and particularly in the combination and arrangement of parts set forth in the claims.

In the following specification and in the claims I use the term "nodal point" to indicate that point where the rays from a distant object to the object glass of a telescope cross each other.

Referring to the drawings:

Figure 1 is a sectional elevation of an optical instrument embodying my invention.

Fig. 2 is a detail section taken on the line 2—2 of Fig. 1.

Fig. 3 is a sectional elevation similar to Fig. 1 and illustrating a housing which is elliptical in cross section.

Fig. 4 is a section taken on line 4—4, Fig. 3.

Fig. 5 is a sectional elevation of my invention as adapted for a periscope, including means for raising and lowering the housing and its inclosed lens system.

Fig. 6 is an enlarged detail section taken on line 6—6 of Fig. 5.

Fig. 7 is a detail section taken on line 7—7 of Fig. 5.

Fig. 8 is a diagrammatic view of the convex objective lens and concave ocular of a Galilean telescope with lines indicating the angular field of view, and the "nodal point."

Fig. 9 is a diagrammatic view of the convex objective lens and convex eye-piece or ocular of an astronomical telescope with lines indicating the angular field of view, and the "nodal point."

Like numerals refer to like parts throughout the several views of the drawings.

In the drawings, Figs. 1 and 2 illustrate my invention in its simplest form, the same consisting of a telescope objective 10, a telescope eye-piece 11 and a housing 12 for said telescope objective and eye-piece. The housing 12 consists of a cylindrical portion 13 in which are inclosed the telescope objective and eye-piece. Said housing consists further of a conical portion 14 which extends from the telescope objective up to the nodal point 15. The nodal point is that point at which a ray of light extending directly from the top of the telescope objective to the bottom of the field of view of said objective crosses another ray of light extending directly from the bottom of said telescope objective to the top of the field of said objective.

The view channel opening 17 at the upper end of the housing is very small, being about three sixteenths of an inch in diameter, and the rays of light coming from the object viewed in a limited field are of very slight angular extension. The said rays are closely housed by the conical portion 14 which provides a restricted channel for the light rays extending from the crossing point of said rays to the telescope objective 10. Thus it will be seen that with the form of my invention illustrated in Figs. 1 and 2, a telescopic view of the object is obtained through a very small top aperture.

In Fig. 3 an embodiment of my invention is illustrated which is substantially the same as that form of my invention illustrated in Fig. 1, namely, there is a telescope objective 10′, telescope eye-piece 11′ and housing 12′, consisting of a cylindrical portion 13′ and a conical portion 14′, extending from the telescope objective to the nodal point 15, but in this form of my invention an apertured diaphragm 19 is inserted in the housing in the vicinity of the nodal point, said flange-like diaphragm having a small round aperture 20 about three sixteenths inch in diameter.

In order that my device when used as a periscope should make the least possible wake when passing through the water I prefer to have the portion of the periscope which projects above and that portion located immediately below the surface of the water when the periscope is in use, of an elliptical shape, such as illustrated in Figs. 3 and 4.

By making the housing of a slender elliptical form in cross section as particularly illustrated in Fig. 4 the wake is practically eliminated and also the vibration of the tubular housing is very much reduced for the reason that a minimum water resistance is secured near the surface, whereby a very slight wake is produced when the submarine is under way.

The form of my invention illustrated in Figs. 1, 2, 3 and 4 is of the simplest character to which my invention can be reduced, but when the same is used in a periscope it is desirable that the rays from the ocular should enter the eye from a horizontal position, while the rays as they pass through the periscope housing must pass in a vertical direction and therefore when my invention is embodied in a periscope the same is preferably constructed as illustrated in Fig. 5 in which 22 is the telescope objective, 23 is the telescope eye-piece, 24 is a totally reflecting prism, 25 is the cylindrical portion of the housing and 26 is the conical portion of the housing, said conical portion 26 extending from the telescope objective 22 to the nodal point 27 and at or adjacent to said nodal point is a totally reflecting prism 29 which diverts the rays so that crossing at the nodal point 27 they pass down the conical portion 26 of the housing to the telescope objective 22 and from the telescope objective the said rays pass to the totally reflecting prism 24 and are reflected by said prism through the telescope eye-piece 23 from whence they converge to the eye of the observer.

The form of my invention embodied in Fig. 5 is substantially the same as that illustrated in Fig. 3, except that it embodies an exterior housing 35 which is elliptical in cross section, as illustrated in Fig. 6. The dimensions of the ellipse may be made in any desired proportion so as to render the same more or less fin-like in shape. The lower portion 36 of the exterior housing is made cylindrical to inclose the interior housing 25, as illustrated in Fig. 7, and this cylindrical housing 36 is slidable in bearings 37 and 38 supported upon a stationary base 39. Said cylindrical exterior housing 36 has a piston 40 fast thereto which is movable vertically in a chamber 41 provided in the stationary support 39.

A pipe 42 leads into the chamber 41 above the piston 40 and another pipe 43 leads into said chamber below the piston 40 so that by introducing the proper fluid under pressure through the pipe 42 the periscope housing and the lenses inclosed therein may be lowered; by introducing said fluid under pressure through the pipe 43 said periscope housing and its lenses may be moved upwardly. The liquid or whatever fluid may be used in the chamber 41 for raising and lowering the periscope housing passes inwardly through the pipe 42 and at the same time passes outwardly through the pipe 43 and vice versa, according to whether the periscope housing is being lowered or raised, respectively.

In said Fig. 6 the interior housing 26 is also shown as elliptical. In using my improved instrument when the same is embodied in the form illustrated in Fig. 5 and when the same is used as a periscope the observer sees the object from the eye-piece 23 and the image is produced after the rays of light pass through the different lenses as hereinbefore set forth. The housing with its lenses is raised or lowered, as hereinbefore described, and may be rotated by rotating the cylindrical portion 36 of the exterior housing in its bearings 37 and 38.

It will be seen that by the construction hereinbefore set forth a very slender tube may be used for that portion of the housing shaft which extends above the surface of the water and the object of using such a tube is to render the portion of the periscope top which projects above the water slender and as inconspicuous as possible in order to avoid discovery by the enemy.

It is obvious that while I prefer to extend my optical instrument in the form of a cone from the telescope objective 10 to the nodal point 15 Fig. 1 so as to have the channel opening for the rays of light as small as possible at the upper end of the telescope, still said conical housing may be stopped short of the nodal point without departing from the spirit of my invention.

The chief object of extending the conical portion of the housing to the nodal point is to get a small diameter diaphragm about the nodal point. It is, however, evident that the conical portion of the housing might be extended from the telescope objective beyond the nodal point, without departing from the spirit of my invention, in which case a more limited view would be obtained than if said conical portion of the housing were stopped at the nodal point, but one of the chief objects of this invention could be obtained by such a construction and this is to be made the subject matter of a divisional application.

It will be readily understood that the nodal point, as hereinbefore defined, is formed by the crossing of the rays extending from the top and bottom of the telescope objective to the bottom and top respectively of the field of said objective and may, in practice, extend over several inches longitudinally of the axis of the objective on account of the very slight divergence of the rays from each other, and, therefore, said nodal point for a given diameter objective and given field is not limited to an exact geometrical point, but may be in practice at any point within several inches longitudinally of the axis of said objective.

The following is a concrete example of the manner in which the nodal point for a telescope of given diameter of objective and field may be obtained: The diameter of the objective being 0.1125 feet and the diameter of the field at a distance of 193 feet from the objective being 3.96 feet, draw a line from the top of the field to the bottom of the objective and from the bottom of the field to the top of the objective and the point where these two lines intersect will be 5.64 feet from the objective or 67.68 inches.

It has been determined by a series of experiments that when the object-distance increases beyond 500 feet the nodal point moves very slowly toward the lens; and, assuming that the angular field of view is of 1° 11′ 15″, an infinitely distant object thus filling the field of view would have its nodal point 5.42 feet from the lens or about 65 inches, that is, about two and one-half inches nearer the lens than the corresponding nodal point for an object only 200 feet distant from the lens.

From different experiments performed with a telescope having the size objective and angular field of view hereinbefore set forth, the nodal point is practically a fixed point for all distances greater than about a quarter of a mile.

In order that sufficient data may be set forth to enable one skilled in the art to find the "nodal point," for an objective of given diameter and focus, two principal types of telescopes must be considered; first, the Dutch or Galilean telescope and second the astronomical telescope.

*First case, Galilean telescope.*

The lenses of this instrument in its simplest form consist, as illustrated in Fig. 8, of a convex objective lens 77 and a concave ocular 78, the rear focal point of the ocular being at or near the rear focal point of the objective as at P on the principal axis AP of the lenses where P is the rear focal point of both lenses.

The following formula may be used for determining the angular field of view: it is a standard formula:

$$\tan A' = \frac{1}{M} \times \frac{R + rM}{L + DM}$$

in which
A′ = half the angle of the angular field of view.

The following data is needed for the calculation of the angle A′:
R = the free radius of the objective.
F = the focal length of the objective.
$f$ = the focal length of the eye lens (the ocular).
L = the optical length of the telescope; this is practically F−$f$.
M = the magnification of the system; this is equal to $\frac{F}{f}$.
$r$ = the radius of the pupil of the eye usually taken as 0.2 centimeters (practically 1/13 inch).
D = the distance between the eye of the observer and the ocular of the telescope; it may be taken as 2 centimeters or say 3/4 of an inch.

Assuming that we have a Galilean telescope, therefore, in which the measurements are as follows:
$r$ = 1/13 of an inch,
R = 0.674 inch,
F = 18 inches,
$f$ = 3 inches,
$M = \frac{F}{f} = 6$,
L = F − $f$ = 15 inches,
D = 3/4 inch, and substitute these dimensions in the formula hereinbefore set forth, we have $$\tan A' = \frac{1}{6} \times \frac{0.674 + (1/13 \times 6)}{15 + (3/4 \times 6)} = .0097$$

The corresponding angle is 33′ 23″ and the greatest angular field visible in the telescope is twice this or 1° 6′ 46″.

To obtain the "nodal point" N we have the simple trigonometrical relation of $$\tan A' = \frac{R}{X} \text{ or } X = \frac{R}{\tan A'} = \frac{0.674}{\tan 33' 23''} = \frac{0.674}{.0097} = 69.4 \text{ in.}$$

and, therefore, the "nodal point" N lies 69.4 inches from the lens 77.

*Second case, astronomical telescope.*

The simplest astronomical telescope consists of a convex objective lens 79 and a convex eye piece or ocular 80, as illustrated in Fig. 9, the front focal point of the ocular being at or near the rear focal point of the objective as indicated in said figure at P.

In order to obtain a sharply defined border to the field of view it is customary to place a diaphragm E at the common focal point of the lenses. Then, if the radius of the hole in the diaphragm be denoted by $d$ the half angle of the field of view of the telescope is obtained by the formula $$\tan A' = \frac{d}{fM}$$

Where M is the magnification $=\frac{F}{f}$ or this formula may be simplified considerably as follows: Knowing that the magnification M is the ratio of the focal lengths F and $f$ the formula may be written $$\tan A' = \frac{d}{fM} = \frac{d}{f\frac{F}{f}} = \frac{d}{F}$$

a very simple relation.

As an example of the application of this formula: Assuming F to be 12 inches and the stop radius $d = 0.1244$ (practically 1/8 of an inch), then we obtain $$\tan A' = \frac{0.1244}{12} = 0.01037$$

which is the tangent of an angle of 35′ 39″. The whole angle of view of the telescope is, therefore, 1° 11′ 18″. A calculation for the "nodal point" N then becomes as before for an instrument in which R=0.674

$$\tan A' = \frac{R}{X} \text{ or } X = \frac{R}{\tan A'} = \frac{0.674}{0.01037} = 65 \text{ inches.}$$

Having thus described my invention, what I claim and desire by Letters Patent to secure is:

1. An optical instrument having, in combination, a telescope objective, a telescope eye-piece, a housing therefor, said housing extending beyond said telescope objective toward the nodal point of said telescope objective and having an opening for the passage of rays of light in its objective end adjacent to said nodal point of substantially smaller diameter than the diameter of said telescope objective.

2. An optical instrument having, in combination, a telescope objective, a telescope eye-piece, a housing therefor, said housing extending beyond said telescope objective in the form of a cone toward the nodal point of said telescope objective.

3. An optical instrument having, in combination, a telescope objective, a telescope eye-piece, a housing therefor, said housing extending beyond said telescope objective in the form of a cone and terminating adjacent to the nodal point of said telescope objective.

4. An optical instrument having, in combination, a telescope objective, a telescope eye-piece, a housing therefor, said housing extending beyond said telescope objective in the form of a cone up to and including the nodal point of said telescope objective, whereby the slightly diverging rays of light of but slight angular extension from said nodal point to said telescope objective may be snugly inclosed.

5. An optical instrument having, in combination, a telescope objective, a telescope eye-piece, and a housing therefor, said housing extending beyond said telescope objective toward the nodal point of said telescope objective and having its inner walls converging toward said nodal point.

6. An optical instrument having, in combination, a telescope objective, a telescope eye-piece and a housing therefor, said housing extending beyond said telescope objective in the form of a long, slender, keen-edged elliptical cone up to and inclosing the nodal point of said telescope objective.

7. An optical instrument having, in combination, a telescope objective, a telescope eye-piece and a housing therefor, said housing extending beyond said telescope objective in the form of a long, slender keen-edged elliptical shaped cone up to and inclosing the nodal point of said telescope objective, whereby the slightly diverging rays of light of but slight angular extension from said nodal point to said telescope objective may be snugly inclosed and but little of sensible intensity of the light rays lost therein.

8. An optical instrument having, in combination, a telescope objective, a telescope eye-piece, a housing therefor, said housing extending beyond said telescope objective up to and inclosing the nodal point of said telescope objective and a small apertured diaphragm centered about the principal axis of said telescope objective and located in said housing adjacent to said nodal point.

9. An optical instrument having, in combination, a telescope objective, a telescope eye-piece, a keen-edged elliptical shaped housing extending beyond said telescope objective toward the nodal point a distance substantially greater than the focal length of said telescope objective and having an opening for the passage of rays of light in its objective end, said objective end of said housing being of substantially smaller diameter than the diameter of said housing at said telescope objective.

10. An optical instrument having, in combination, a telescope objective, a telescope eye-piece, a housing therefor, said housing extending beyond said telescope objective toward the nodal point of said telescope objective and having an opening for the passage of rays of light in its objective end adjacent to said nodal point of substantially smaller diameter than the diameter of said telescope objective, and means to raise and lower said housing.

11. An optical instrument having, in combination, a telescope objective, a telescope eye-piece, a housing therefor, said housing extending beyond said telescope objective toward the nodal point of said telescope objective and having an opening for the passage of rays of light in its objective end adjacent to said nodal point of substantially smaller diameter than the diameter of said telescope objective, a support upon which said housing is rotatably mounted and means to raise and lower said housing.

12. An optical instrument having, in combination, a telescope objective, a telescope eye-piece, a housing therefor, said housing extending beyond said telescope objective toward the nodal point of said telescope objective and having an opening for the passage of rays of light in its open end adjacent to said nodal point of substantially smaller diameter than the diameter of said telescope objective and a totally reflecting prism located adjacent to said eye-piece and between said eye-piece and telescope objective.

13. An optical instrument having, in combination, a telescope objective, a telescope eye-piece, a housing therefor, said housing extending beyond said telescope objective in the form of a cone toward the nodal point of said objective and a totally reflecting prism located in said housing intermediate said eye-piece and objective and adjacent to said eye-piece.

14. An optical instrument having, in combination, a telescope objective, a telescope eye-piece, a housing therefor, said housing extending beyond said telescope objective toward the nodal point of said telescope objective and having an opening for the passage of rays of light in its open end adjacent to said nodal point of substantially smaller diameter than the diameter of said telescope objective, a totally reflecting prism located at one end of said housing adjacent to said eye-piece and intermediate said eye-piece and objective and another totally reflecting prism located in the opposite end of said housing.

15. An optical instrument having, in combination, a telescope objective, a telescope eye-piece, a housing therefor, said housing extending beyond said telescope objective in the form of a cone toward the nodal point of said telescope objective, a totally reflecting prism located at one end of said housing adjacent to said eye-piece and intermediate said eye-piece and objective and another totally reflecting prism located at the opposite end of said housing.

In testimony whereof I have hereunto set my hand in presence of two subscribing witnesses.

HARRY H. PECK.

Witnesses:
CHARLES S. GOODING,
SYDNEY E. TAFT.

Copies of this patent may be obtained for five cents each, by addressing the "Commissioner of Patents, Washington, D. C."